United States Patent
Silverman et al.

(10) Patent No.: US 12,507,156 B2
(45) Date of Patent: Dec. 23, 2025

(54) THIRD-PARTY ENABLED INTERFERENCE CLASSIFICATION PLATFORM

(71) Applicant: Cisco Technology, Inc., San Jose, CA (US)

(72) Inventors: Matthew A. Silverman, Shaker Heights, OH (US); Michael B. Delong, Macedonia, OH (US); Ashish Pasha Sheikh, Akron, OH (US); Federico Lovison, Fontanelle (IT)

(73) Assignee: Cisco Technology, Inc., San Jose, CA (US)

( * ) Notice: Subject to any disclaimer, the term of this patent is extended or adjusted under 35 U.S.C. 154(b) by 448 days.

(21) Appl. No.: 18/061,986

(22) Filed: Dec. 5, 2022

(65) Prior Publication Data
US 2024/0187970 A1    Jun. 6, 2024

(51) Int. Cl.
*H04W 48/08*     (2009.01)
*G01S 5/02*     (2010.01)
*H04W 24/08*     (2009.01)

(52) U.S. Cl.
CPC ......... *H04W 48/08* (2013.01); *G01S 5/02521* (2020.05); *H04W 24/08* (2013.01)

(58) Field of Classification Search
CPC ...... H04W 24/08; H04W 48/08; G06N 20/00; G01S 5/02521
See application file for complete search history.

(56) References Cited

U.S. PATENT DOCUMENTS

| | | | |
|---|---|---|---|
| 7,426,497 B2 * | 9/2008 | Bacioiu | G06F 18/217 706/20 |
| 2017/0147940 A1 * | 5/2017 | Mitola, III | G06N 20/00 |
| 2018/0323815 A1 * | 11/2018 | Beadles | H04W 24/08 |
| 2019/0357074 A1 * | 11/2019 | Priore | H04W 28/0236 |
| 2020/0334575 A1 | 10/2020 | O'Shea | |
| 2021/0334622 A1 | 7/2021 | Singh et al. | |
| 2022/0131623 A1 | 4/2022 | Garcia et al. | |
| 2022/0210659 A1 | 6/2022 | Montalvo et al. | |
| 2023/0006913 A1 * | 1/2023 | Lo | H04L 41/0853 |

(Continued)

FOREIGN PATENT DOCUMENTS

CA     3157102 A1 *    5/2021    ............... H04B 3/54

OTHER PUBLICATIONS

Shirvani et al., Cloud-Based Context-Aware Spectrum Availability Monitoring and Prediction Using Crowd-Sensing, Springer Nature, 2019, pp. 29-45.

(Continued)

*Primary Examiner* — Mong-Thuy T Tran
(74) *Attorney, Agent, or Firm* — Patterson + Sheridan, LLP

(57) ABSTRACT

Techniques for classification of wireless signals are disclosed. These techniques include receiving data describing radio frequency characteristics of a wireless network transmission environment and presenting the data for display on a graphical user interface (GUI) associated with a network device in the wireless network. The techniques further include receiving input from the GUI identifying one or more portions of the data, and training a machine learning (ML) model to classify an interferer in the wireless network transmission environment based on the identified one or more portions of the data.

17 Claims, 5 Drawing Sheets

(56) References Cited

U.S. PATENT DOCUMENTS

| | | | |
|---|---|---|---|
| 2023/0188233 A1* | 6/2023 | Gupta Hyde | H04B 17/3913 |
| | | | 370/329 |
| 2024/0097352 A1* | 3/2024 | El-Akkad | H01Q 1/1264 |
| 2024/0357399 A1* | 10/2024 | Ren | H04B 17/345 |
| 2024/0372272 A1* | 11/2024 | El-Akkad | H01Q 21/205 |

OTHER PUBLICATIONS

Boudreau et al., A Cloud-Based Spectrum Environment Awareness System, Crown, 2017.

* cited by examiner

THIRD-PARTY ENABLED INTERFERENCE CLASSIFICATION PLATFORM

TECHNICAL FIELD

Embodiments presented in this disclosure generally relate to wireless communication. More specifically, embodiments disclosed herein relate to classification of wireless signals using machine learning.

BACKGROUND

The use of 6 GHz spectrum for wireless communication (e.g., for WiFi) gives rise to many new potentially interfering devices. Detecting these interferers is important, because it allows a WiFi network to be configured to avoid the interferers, but it is also very challenging. In particular, different deployments and different geographical locations have very different 6 GHz signals that can cause interference with WiFi transmission. Existing techniques for detecting interferers rely on centralized detection. But this is not feasible for 6 GHz spectrum deployments, because of the wide variety and specificity of potential interferers.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
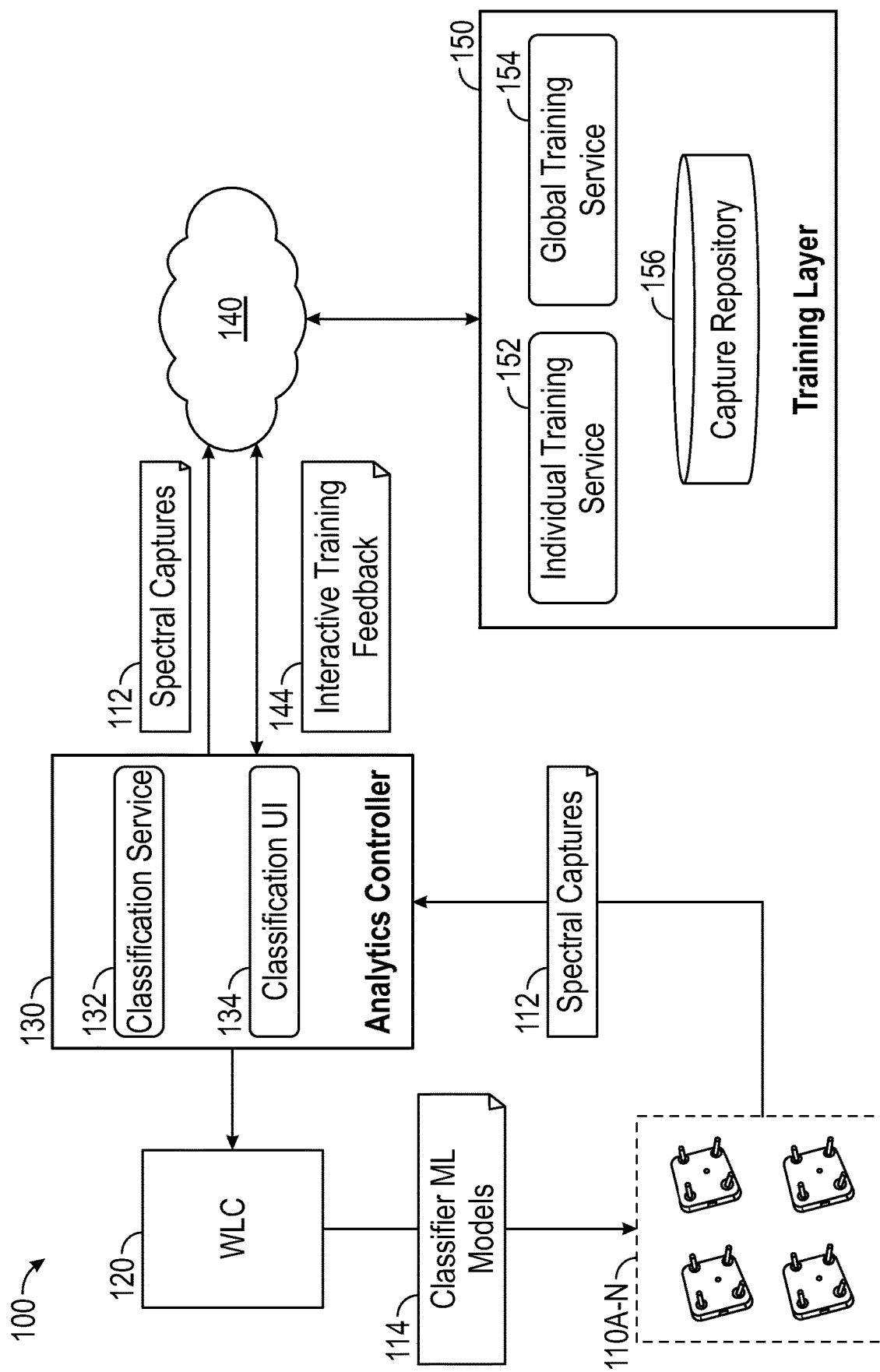
FIG. 1 illustrates a computing environment for a third-party enabled interference classification platform, according to one embodiment.

Embodiments include a method. The method includes receiving data describing radio frequency characteristics of a wireless network transmission environment. The method further includes presenting the data for display on a graphical user interface (GUI) associated with a network device in the wireless network. The method further includes receiving input from the GUI identifying one or more portions of the data. The method further includes training a machine learning (ML) model to classify an interferer in the wireless network transmission environment based on the identified one or more portions of the data.

Embodiments further include a system, including a processor and a memory having instructions stored thereon which, when executed on the processor, performs operations. The operations include receiving data describing radio frequency characteristics of a wireless network transmission environment. The operations further include presenting the data for display on a graphical user interface (GUI) associated with a network device in the wireless network. The operations further include receiving input from the GUI identifying one or more portions of the data. The operations further include training a machine learning (ML) model to classify an interferer in the wireless network transmission environment based on the identified one or more portions of the data.

Embodiments further include a non-transitory computer-readable medium having instructions stored thereon which, when executed by a processor, performs operations. The operations include receiving data describing radio frequency characteristics of a wireless network transmission environment. The operations further include presenting the data for display on a graphical user interface (GUI) associated with a network device in the wireless network. The operations further include receiving input from the GUI identifying one or more portions of the data. The operations further include training a machine learning (ML) model to classify an interferer in the wireless network transmission environment based on the identified one or more portions of the data.

EXAMPLE EMBODIMENTS

In an embodiment, one or more techniques described below provide a way for third parties (e.g., system administrator users implementing a WiFi deployment) to capture data reflecting a wireless network transmission environment, and use that data to create and train their own machine learning (ML) models to classify interferers in the environment. For example, a user can collect data (e.g., spectrogram data) describing the radio signal environment for the WiFi deployment. Potential interferers from known wireless networks (e.g., WiFi and cellular networks) can be identified using existing techniques (e.g., existing classifiers can identify neighboring wireless network signals as potential interferers).

But it is much more challenging to classify interferers that do not come from wireless networks (e.g., that do not come from WiFi or cellular networks), especially interferes in the 6 GHz band. Existing wireless local area network (WLAN) controllers (WLCs) and wireless access points (APs) do not know how to classify such signals, and so they cannot effectively configure the wireless network to avoid these interferers.

In an embodiment, this can be improved by using a trained ML model to classify unknown interferers. For example, as discussed further below with regard to FIGS. 3-4, a user (e.g., a system administrator) can interactively train an ML model to classify interferers based on data (e.g., spectrogram data) captured at an AP in a WiFi deployment. Existing classifiers can be used to identify known signals in the environment (e.g., WiFi signals) and potential interferers. The user can be presented with a user interface (UI), for example a graphical UI (GUI), and can use the UI to identify portions of spectrogram data that may relate to interferers. This can be used to create labeled spectrogram data, and the labeled spectrogram data can be used to train a classifier ML model. The classifier ML model can then be provided to devices in the WiFi deployment (e.g., APs, WLCs, and any other suitable devices). These devices (e.g., APs) can use the trained classifier ML model to identify interferers and configure the wireless network to avoid the interferers and improve network performance. This is discussed further, below, with regard to FIGS. 3-5.

FIG. 1 illustrates a computing environment 100 for a third-party enabled interference classification platform, according to one embodiment. In an embodiment, the computing environment 100 includes one or more APs 110A-N, which are respectively associated with a variety of wireless stations (STAs). For example, one or more of the APs 110A-N can be used to coordinate wireless access (e.g., WiFi access) for each of the STAs. The STAs can include any suitable wireless devices, including computers, smartphones, tablets, wearable devices, Internet of Things (IoT) devices, APs, and any other suitable wireless device. In an embodiment, the APs 110A-N are further associated with a controller. For example, the WLC 120 can be used to control the APs 110A-N.

In an embodiment, the APs 110A-N support operation in the 6 GHz band. For, example, the APs 110A-N can support operation in any, or all, of the 2.4 GHz band, the 5 GHz band, and the 6 GHz band. The 6 GHz band, however, can include existing devices (e.g., non-WiFi incumbent devices) that create interference with WiFi operation by the APs 110A-N. In an embodiment, the WLC 120 can coordinate with the APs 110A-N to avoid these interferers and improve network performance. But the WLC 120, the APs 110A-N, or both, must be able to classify the interferers (e.g., identify the characteristics of the interferers) in order to successfully improve network performance.

Classifying the interferers can be very challenging, especially for non-WiFi 6 GHz interferers, because the interferers can vary dramatically by geographical location and WiFi deployment. For example, one geographic location could commonly include one type of interfering device, while another geographic location includes a wholly different type of interfering device. Classifying these interferers, across different WiFi deployments and geographic locations, is very challenging.

In an embodiment, the WLC 120, the APs 110A-N, or both, can use one or more classifier ML models 114 to classify interferers. For example, a training layer 150 can be used to train one or more classifier ML models 114, and these models can then be used to classify interferers. The classifier ML models 114 can be any suitable ML models, including deep learning neural networks (DNNs) or any other suitable ML model. In an embodiment, a system developer could attempt train a wide variety of classifiers, prior to deploying a wireless deployment, and could store the classifiers for users. But because of the huge variety of potential interferers, especially in the 6 GHz band, this is not practically feasible.

Instead, a user (e.g., a system administrator for a wireless deployment) can interact with an analytics controller 130 to train classifiers for a specific wireless deployment or collection of wireless deployments. The APs 110A-N can capture a series of spectral captures 112 (e.g., spectrograms) describing the wireless environment in which the APs 110A-N are operating. The APs 110A-N can transmit the spectral captures 112 to the analytics controller 130.

In an embodiment, the analytics controller 130 can transmit the spectral captures 112 to a training layer 150 using a cloud environment 140. For example, the analytics controller 130 can include a classification service 132, which can facilitate transmitting the spectral captures 112 to the training layer 150 using the cloud environment 140. In an embodiment, the training layer 150 can maintain the spectral captures 112 in a capture repository 156. In an embodiment, the capture repository 156 is any suitable electronic storage repository, including an electronic database (e.g., a relational database, a graph database, or any other suitable database), a cloud storage location (e.g., a public cloud, a private cloud, or a hybrid cloud), an on-site or remote storage location, a distributed storage location (e.g., a blockchain), or any other suitable electronic storage repository.

The training layer 150 can then use an individual training service 152, a global training service 154, or both, to train an ML model to classify interferers using the spectral captures 112. For example, the individual training service 152 can use spectral captures 112 from a given wireless deployment to train one or more classifiers for that deployment. As another example, the global training service 154 can use spectral captures 112 from a variety of wireless deployments (e.g., all available wireless deployments) to train classifiers for a deployment.

In an embodiment, interactive training (e.g., with a system administrator user) can be used to generate a trained classifier ML model. For example, the analytics controller 130 can include a classification UI 134. The classification UI 134 can be any suitable UI (e.g., a GUI or any other suitable UI) and can present to a user a captures spectrogram for interactive training. The user can mark portions of the spectrogram as potentially relevant (e.g., using the classification UI 134), and the classification service 132 can label the spectral captures 112 based on this user feedback. The analytics controller 130 can then transmit the labeled spectral captures 112 to the training layer 150, using the cloud environment 140. The training layer 150 can then use the labeled spectral captures 112 for training a classifier ML model.

In an embodiment, the interactive training can further involve an iterative process in which the classification UI 134 presents to a user an example of classification inference from the trained classifier. For example, a user can identify portions of one or more of the spectral captures 112 as likely interferers. The training layer 150 can use a trained classifier ML model to identify additional portions of the spectral captures 112 that appear to match the marked interferer. The training layer can transmit these as interactive training feedback 144 to the analytics controller 130, using the cloud environment 140. The classification UI 134 can then present the identified, predicted, interferers to the user, and the user can iteratively mark which (if any) of the identified portions of the interactive training feedback 144 (e.g., classified spectral captures) were correctly classified. The ML model can be further trained based on this interaction, and the process can repeat until the trained classifier ML model is deemed sufficiently accurate (e.g., based on a threshold value).

In an embodiment, the various components of the computing environment 100 communicate using one or more suitable communication networks, including the Internet, a wide area network, a local area network, or a cellular network, and uses any suitable wired or wireless communication technique (e.g., WiFi or cellular communication). Further, in an embodiment, the WLC 120, analytics controller 130, cloud environment 140, and training layer 150, can be implemented using any suitable combination of physical compute systems, cloud compute nodes and storage locations, or any other suitable implementation. For example, the WLC 120, analytics controller 130, cloud environment 140, and training layer 150, could each be implemented using a respective server or cluster of servers. As another example, the WLC 120, analytics controller 130, cloud environment 140, and training layer 150, can be implemented using a combination of compute nodes and storage locations in a suitable cloud environment. For example, one or more of the components of the WLC 120, analytics controller 130, cloud environment 140, and training layer 150, can be implemented using a public cloud, a private cloud, a hybrid cloud, or any other suitable implementation.

Figure 2:
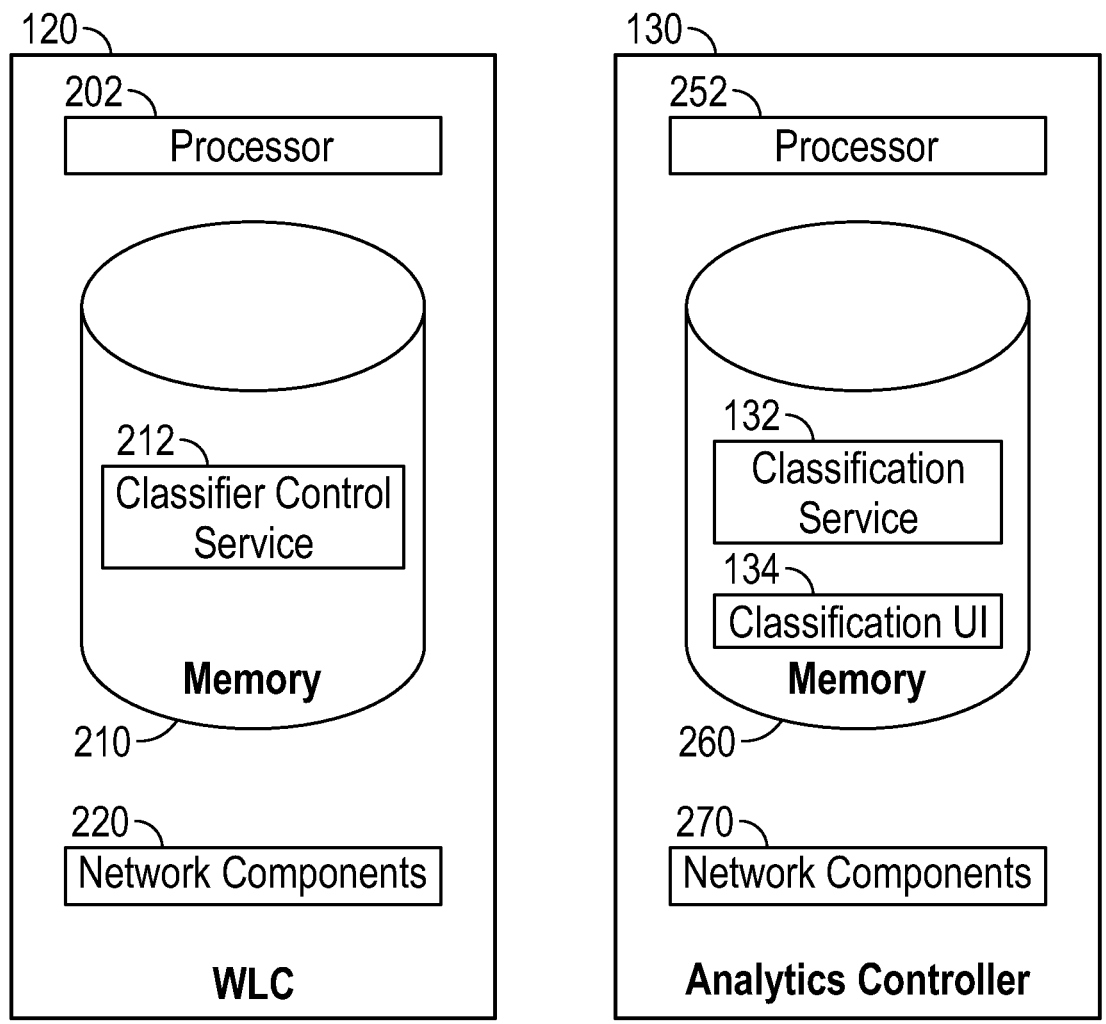
FIG. 2 illustrates controllers for a third-party enabled interference classification platform, according to one embodiment.

FIG. 2 illustrates controllers for a third-party enabled interference classification platform, according to one embodiment. A WLC 120 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the WLC 120 to interface with a communication network, as discussed above in relation to FIG. 1. For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the WLC 120. The program code is generally described as various functional "applications" or "modules" within the memory 210, although alternate implementations may have different functions and/or combinations of functions. Within the memory 210, the classifier control service 212 facilitates third-party enabled interference classification. This is discussed further, below, with regard to FIGS. 3-6. Further, using a WLC 120 for third-party enabled interference classification is merely one example. Alternatively, or in addition, any other network device (e.g., an AP, another controller, or another network component) can be used.

The analytics controller 130 includes a processor 252, a memory 260, and network components 270. The processor 252 generally retrieves and executes programming instructions stored in the memory 260. The processor 252 is representative of a single CPU, multiple CPUs, a single CPU having multiple processing cores, graphics processing units (GPUs) having multiple execution paths, and the like.

The network components 270 include the components necessary for the analytics controller 130 to interface with a communication network, as discussed above in relation to FIG. 1. For example, the network components 270 can include wired, WiFi, or cellular network interface components and associated software. Although the memory 260 is shown as a single entity, the memory 260 may include one or more memory devices having blocks of memory associated with physical addresses, such as random access memory (RAM), read only memory (ROM), flash memory, or other types of volatile and/or non-volatile memory.

The memory 260 generally includes program code for performing various functions related to use of the analytics controller 130. The program code is generally described as various functional "applications" or "modules" within the memory 260, although alternate implementations may have different functions and/or combinations of functions. Within the memory 260, the classification service 132 facilitates third-party enabled interference classification. The classification UI 134 presents a UI (e.g., a GUI) to a user to allow for interactive training of an classifier ML model. These are both discussed further, below, with regard to FIGS. 3-6. Further, using an analytics controller 130 for third-party enabled interference classification is merely one example. Alternatively, or in addition, any other network device (e.g., an AP, another controller, or another network component) can be used.

While the WLC 120 and analytics controller 130 are each illustrated as a single entity, in an embodiment, the various components can be implemented using any suitable combination of physical compute systems, cloud compute nodes and storage locations, or any other suitable implementation. For example, the WLC 120, analytics controller 130, or both, could be implemented using a server or cluster of servers. As another example, the WLC 120, analytics controller 130, or both, can be implemented using a combination of compute nodes and storage locations in a suitable cloud environment. For example, one or more of the components of the WLC 120, analytics controller 130, or both, can be implemented using a public cloud, a private cloud, a hybrid cloud, or any other suitable implementation.

Although FIG. 2 depicts the classifier control service 212 as being located in the memory 210 and the classification service 132 and classification UI 134 as being located in the memory 260, that representation is also merely provided as an illustration for clarity. More generally, the WLC 120, analytics controller 130, or both, may include one or more computing platforms, such as computer servers for example, which may be co-located, or may form an interactively linked but distributed system, such as a cloud-based system, for instance. As a result, the processors 202 and 252, and the memories 210 and 260, may correspond to distributed processor and memory resources within the computing environment 100. Thus, it is to be understood that the classifier control service 212, classification service 132, and classification UI 134 may be stored at any suitable location within the distributed memory resources of the computing environment 100.

Figure 3:
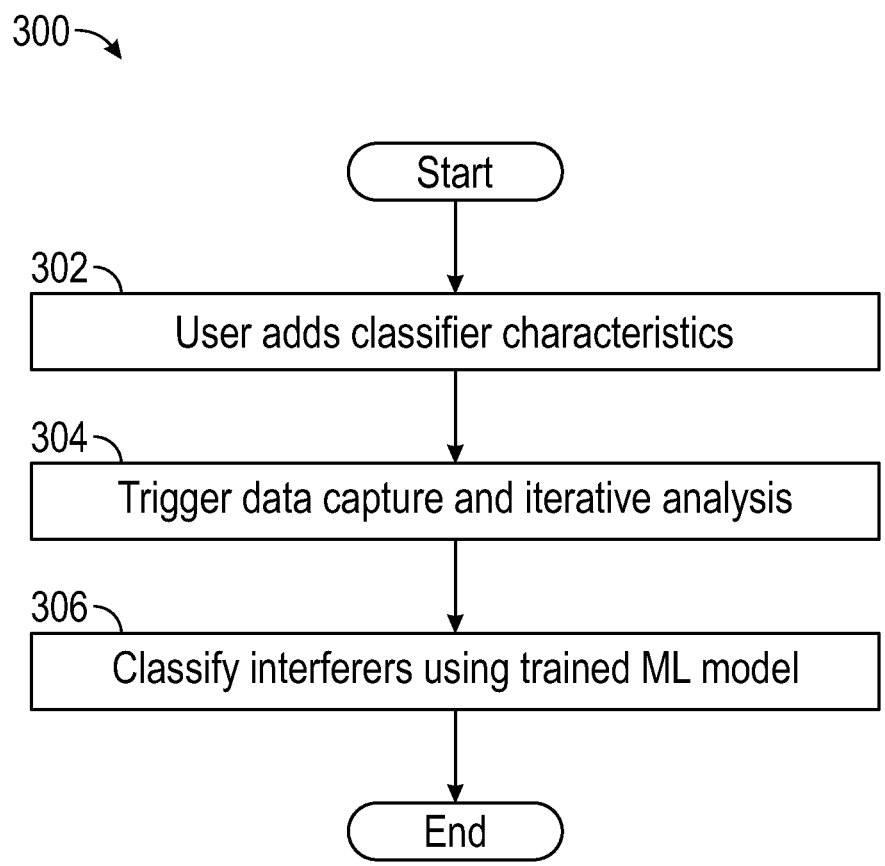
FIG. 3 is a flowchart illustrating an interactive third-party enabled interference classification platform, according to one embodiment.

FIG. 3 is a flowchart 300 illustrating an interactive third-party enabled interference classification platform, according to one embodiment. At block 302, a user (e.g., a system administrator for a wireless deployment) adds classifier characteristics. In an embodiment, the user can interact with a suitable UI (e.g., the classification UI 134 illustrated in FIG. 1) to add characteristics for a new classifier.

For example, the user can enter a name for the classifier, along with characteristics of the interferer being classified. The characteristics can include impacted channels, an expected duty cycle range, an instantaneous bandwidth, a type (e.g., frequency hopper), or any other suitable characteristics. These are merely examples, and the user can enter any suitable characteristics. Further, a classification service (e.g., the classification service 132 illustrated in FIGS. 1-2, the classifier control service 212 illustrated in FIG. 2, or any other suitable service) can identify characteristics for the interferer from any suitable source. This can include an electronic repository, a prior classifier, a human administrator, or any other suitable source.

At block 304, the classification service triggers data capture and iterative analysis. For example, a user (e.g., a system administrator for a wireless deployment) can trigger an AP (e.g., one or more of the APs 110A-N illustrated in FIG. 1) to capture spectrogram data. In an embodiment, spectrogram data is merely one example of data that can be captured and use to train a classifier ML model. Spectrogram data may be suitable because it describes both time and frequency. Alternatively however, or in addition, time domain captures, processed spectrograms, or any other suitable data can be used.

Further, the classification service can trigger iterative analysis. This can include iterative training of a classifier ML model, using user input. The trained model can then be pushed to the AP, and the associated information can be transmitted to a suitable controller (e.g., the WLC 120 illustrated in FIG. 1, the analytics controller 130, or both). Both data capture and iterative analysis are discussed further, below, with regard to FIG. 4.

At block 306, the AP classifies interferers using the trained ML model. For example, the AP can use the newly trained model generated at block 304 to classify a newly identified interferer. Further, the AP can detect duty cycle, impact to each channel, and other parameters of the interferer. In an embodiment, the AP, the WLC, or any other suitable network component, can use the classified interferer to configure the wireless network (e.g., WiFi network) and improve network performance by reducing impact from the interferer. In an embodiment, a controller (e.g., the WLC) can record a string identifying the name of the interferer, and can merge classification of the interferer across APs (e.g., across APs serviced by the WLC).

Figure 4:
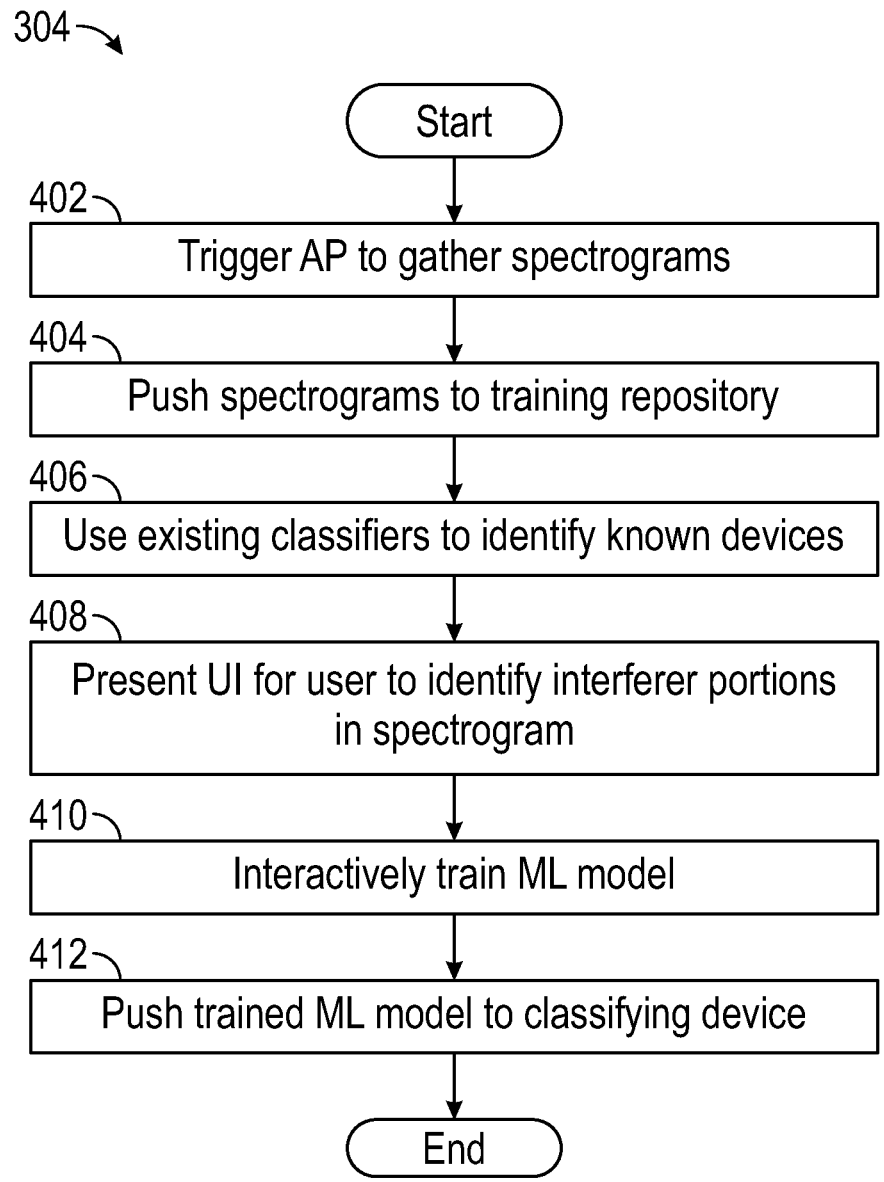
FIG. 4 is a flowchart illustrating data capture and user analysis for an interactive third-party enabled interference classification platform, according to one embodiment.

FIG. 4 is a flowchart illustrating data capture and user analysis for an interactive third-party enabled interference classification platform, according to one embodiment. In an embodiment, FIG. 4 corresponds with block 304 illustrated in FIG. 3. At block 402, a user (e.g., a system administrator) triggers an AP (e.g., one or more of the APs 110A-N illustrated in FIG. 1) to gather spectrograms. As discussed above in relation to block 304, spectrograms are merely one example of suitable data and any suitable data describing the wireless transmission environment (e.g., time domain data, frequency domain data, both, or any other suitable data) can be used. In an embodiment, data can be gathered periodically (e.g., every 30 seconds or any other suitable duration), on demand, or using any other suitable technique.

Further, in an embodiment, any suitable entity can trigger data gathering. For example, an automated process could trigger data gathering. The automated process could be scheduled, or could be triggered based on identifying poor network performance or any other suitable criteria. Any suitable network component can also gather data (e.g., instead of or in addition to an AP). For example, a network component other than an AP could be used to capture data about the network transmission environment.

At block 404, a classification service (e.g., the classification service 132 illustrated in FIGS. 1-2, the classifier control service 212 illustrated in FIG. 2, or any other suitable service) pushes the spectrograms to a training repository (e.g., the capture repository 156 in the training layer 150 illustrated in FIG. 1). In an embodiment, this training repository can be associated with a WLC (e.g., the WLC 120 illustrated in FIG. 1), an analytics controller (e.g., the analytics controller 130 illustrated in FIG. 1), a cloud environment (e.g., the cloud environment 140 illustrated in FIG. 1), or any other suitable storage location.

At block 406, the classification service uses existing classifiers to identify known devices. For example, the classification service can use existing classifiers to identify known WiFi devices, cellular devices, previously identified interferers, or any other suitable wireless devices. The classification service can identify any remaining spectrograms (e.g., that cannot be classified using existing classifiers), as unknown or unidentified.

At block 408, a classification UI (e.g., the classification UI 134 illustrated in FIG. 1) presents a UI (e.g., a GUI) for a user (e.g., a system administrator) to identify interferer portions in a spectrogram. For example, a user can be prompted to look at spectrograms for unknown or unidentified signals. The user can select portions of the spectrogram that they identify as relating to the interferer being classified. The user can use any suitable technique to identify the relevant portions of spectrograms, including circling the portions (e.g., using a mouse or touch sensitive display), highlighting the portions, or any other suitable technique.

At block 410, the classification service interactively trains the ML model. For example, the classification service can use the identified portions of the spectrogram to train a classifier ML model. The classification service can then use that trained classifier ML model to identify additional portions of spectrograms that the ML model classifies as relating to the same ML model. The classification UI can present these predicted classifications to the user, and the user can be prompted to input whether the classifier ML model accurately classified the interferer. The classification service can then use this interactive feedback (e.g., interactive training feedback 144 illustrated in FIG. 1) to further train the classifier ML model.

At block 412, the classification service pushes the trained ML model to a classifying device. In an embodiment, the classification service identifies when the interactive training at block 410 has reached a sufficient success rate. For example, the classification can use a threshold value (e.g., a default threshold, a user-configurable threshold, an empirically derived threshold, or any other suitable threshold value). When the success rate meets, or exceeds, the threshold value the classification service pushes the trained ML model to the classifying device. In an embodiment, the classifying device is an AP (e.g., one or more of the APs 110A-N illustrated in FIG. 1). Alternatively, or in addition, the classifying device can be any other suitable network component.

Figure 5:
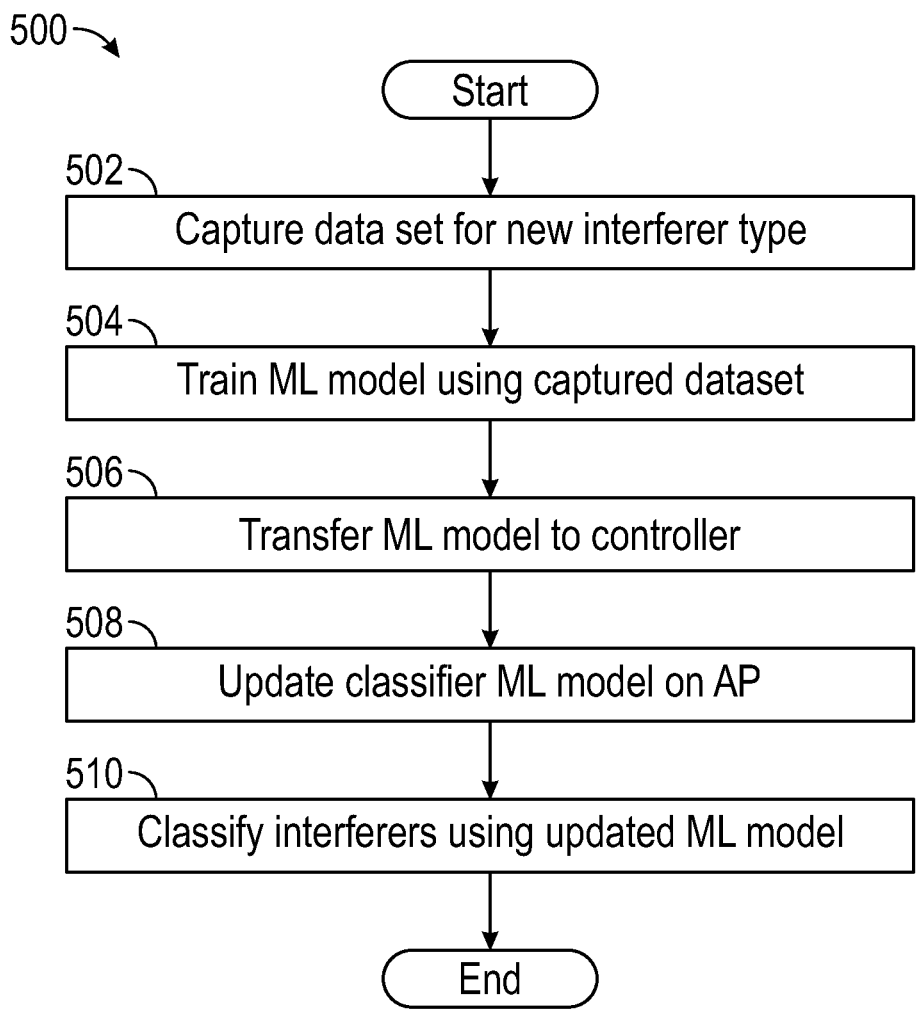
FIG. 5 is a flowchart illustrating a third-party enabled interference classification platform, according to one embodiment.

FIG. 5 is a flowchart 500 illustrating a third-party enabled interference classification platform, according to one embodiment. At block 502, an AP (e.g., one or more of the APs 110A-N illustrated in FIG. 1) captures a data set. For example, as discussed above in relation to block 304 illustrated in FIG. 3 and block 402 illustrated in FIG. 4, the AP can gather spectrogram data from the wireless environment. An AP is merely an example, and any suitable network device can be used. Further, recorded data (e.g., spectrogram data recorded in a repository) can be used instead of, or in addition to, live captures.

At block 504, a classification service (e.g., the classification service 132 illustrated in FIGS. 1-2, the classifier control service 212 illustrated in FIG. 2, or any other suitable service) trains an ML model using the captured dataset. For example, the classification service can use any suitable ML model training tool to train a classifier. This can be done offline (e.g., without requiring real-time data), in real-time, or at any other suitable time.

At block 506, the classification service transfers the ML model (e.g., the ML model trained at block 504) to a controller. For example, the classification service can transfer the ML model to an analytics controller (e.g., the analytics controller 130 illustrated in FIG. 1), a WLC (e.g., the WLC 120 illustrated in FIG. 1), or any other suitable controller. This is merely an example, and any suitable network device can be used.

At block 508, the classification service updates the classifier on the AP. For example, the controller can transfer the trained classifier ML model to the AP. As discussed above, in an embodiment the controller can record a string identifying the name of the interferer, and can merge classification of the interferer across APs (e.g., across APs serviced by the controller). Using an AP as a classifying device is merely one example, and any suitable network component can be used (e.g., a controller).

At block 510, the AP classifies interferers using the updated ML model. As discussed above in relation to block 306 illustrated in FIG. 3, in an embodiment the AP can detect duty cycle, impact to each channel, and other parameters of the interferer. In an embodiment, the AP, the WLC, or any other suitable network component, can use the classified interferer to configure the wireless network (e.g., WiFi network) and improve network performance by reducing impact from the interferer.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
receiving data describing radio frequency characteristics of a wireless network transmission environment;
presenting the data for display on a graphical user interface (GUI) associated with a network device in the wireless network;
receiving input from the GUI identifying one or more portions of the data; and
training a machine learning (ML) model to classify an interferer in the wireless network transmission environment using the identified one or more portions of the data;
classifying an additional one or more portions of the data as relating to the interferer, using the ML model;
presenting the classified additional one or more portions of the data for display on the GUI;
receiving a second input from the GUI reflecting accuracy of the classification of the additional one or more portions of the data as relating to the interferer; and
further training the ML model using the second input.

2. The method of claim 1,
wherein the data describing the wireless network transmission environment is captured at a wireless access point (AP), and
wherein the GUI is associated with at least one of: (i) the AP or (ii) a controller in the network environment.

3. The method of claim 2, further comprising:
transmitting the trained ML model to the AP, wherein the AP is configured to classify the interferer using the trained ML model.

4. The method of claim 1, wherein receiving input from the GUI identifying one or more portions of the data comprises receiving input identifying one or more portions of the data reflecting the interferer.

5. The method of claim 1,
wherein the data describing radio frequency characteristics of the wireless network transmission environment comprises spectrogram data describing radio frequency and time characteristics of the wireless network transmission environment, and
wherein receiving the input from the GUI identifying one or more portions of the data comprises receiving identification of one or more portions of the spectrogram data.

6. The method of claim 1, further comprising:
identifying one or more known signals in the received data based on using one or more previously generated classifiers with the received data; and
displaying one or more unknown signals in the data on the GUI, based on the identified one or more known signals.

7. The method of claim 1, further comprising:
determining that the ML model is sufficiently trained based on the received second input from the GUI.

8. The method of claim 1,
wherein the wireless network transmission environment comprises a WiFi network supporting a 6 GHz band, and
wherein the interferer in the wireless network transmission environment operates using at least a portion of the 6 GHz band.

9. The method of claim 1, further comprising:
configuring one or more parameters for the wireless network based on classifying the interferer using the trained ML model.

10. A system, comprising:
a processor; and
a memory having instructions stored thereon which, when executed on the processor, performs operations comprising:
receiving data describing radio frequency characteristics of a wireless network transmission environment;
presenting the data for display on a graphical user interface (GUI) associated with a network device in the wireless network;
receiving input from the GUI identifying one or more portions of the data;
training a machine learning (ML) model to classify an interferer in the wireless network transmission environment using the identified one or more portions of the data;
classifying an additional one or more portions of the data as relating to the interferer, using the ML model;
presenting the classified additional one or more portions of the data for display on the GUI;
receiving a second input from the GUI reflecting accuracy of the classification of the additional one or more portions of the data as relating to the interferer; and
further training the ML model using the second input.

11. The system of claim 10,
wherein the data describing the wireless network transmission environment is captured at a wireless access point (AP), and
wherein the GUI is associated with at least one of: (i) the AP or (ii) a controller in the network environment.

12. The system of claim 11, the operations further comprising:
transmitting the trained ML model to the AP, wherein the AP is configured to classify the interferer using the trained ML model.

13. The system of claim 10, wherein receiving input from the GUI identifying one or more portions of the data comprises receiving input identifying one or more portions of the data reflecting the interferer.

14. A non-transitory computer-readable medium having instructions stored thereon which, when executed by a processor, performs operations comprising:
receiving data describing radio frequency characteristics of a wireless network transmission environment;
presenting the data for display on a graphical user interface (GUI) associated with a network device in the wireless network;
receiving input from the GUI identifying one or more portions of the data;
training a machine learning (ML) model to classify an interferer in the wireless network transmission environment using the identified one or more portions of the data;
classifying an additional one or more portions of the data as relating to the interferer, using the ML model;
presenting the classified additional one or more portions of the data for display on the GUI;
receiving a second input from the GUI reflecting accuracy of the classification of the additional one or more portions of the data as relating to the interferer; and
further training the ML model using the second input.

15. The non-transitory computer-readable medium of claim 14,
wherein the data describing the wireless network transmission environment is captured at a wireless access point (AP), and wherein the GUI is associated with at least one of: (i) the AP or (ii) a controller in the network environment.

16. The non-transitory computer-readable medium of claim 15, the operations further comprising:
transmitting the trained ML model to the AP, wherein the AP is configured to classify the interferer using the trained ML model.

17. The non-transitory computer-readable medium of claim 14, wherein receiving input from the GUI identifying one or more portions of the data comprises receiving input identifying one or more portions of the data reflecting the interferer.

* * * * *